United States Patent [19]

Kellner

[11] 4,319,815

[45] Mar. 16, 1982

[54] PRISM VIEW FINDER FOR REFLEX CAMERAS WITH BUILT-IN EXPOSURE METER

[76] Inventor: Ferdinand Kellner, Spittelmüllerstr. 6, 8940 Memmingen, Fed. Rep. of Germany

[21] Appl. No.: 205,946

[22] Filed: Nov. 12, 1980

[30] Foreign Application Priority Data

Nov. 21, 1979 [DE] Fed. Rep. of Germany ....... 2946905

[51] Int. Cl.³ .................. G03B 7/00; G03B 19/12; G03B 13/08
[52] U.S. Cl. .................... 354/59; 354/155; 354/224; 354/225
[58] Field of Search ............. 354/23 R, 56, 59, 155, 354/224, 225

[56] References Cited

U.S. PATENT DOCUMENTS

| | | | |
|---|---|---|---|
| 2,364,652 | 12/1944 | Pollock | 354/155 |
| 3,732,775 | 5/1973 | Warstat | 354/56 |
| 3,967,287 | 6/1976 | Kimura et al. | 354/56 |
| 4,134,652 | 1/1979 | Kiyohara et al. | 354/56 |

Primary Examiner—Russell E. Adams
Attorney, Agent, or Firm—Holman & Stern

[57] ABSTRACT

The subject of the invention is a prism viewfinder for reflex cameras with built-in exposure meter means. It is of the known kind in which the prism has a bevel face reflecting the received image on to a mirror face which in turn reflects in to an eyepiece and a light-sensitive element of the exposure meter means adjacent to this eyepiece. In the present invention the image is also reflected by the mirror face on to an additional plane face and immediately adjacent the light-sensitive element, thereby giving an enhanced image and improved exposure measuring results.

5 Claims, 2 Drawing Figures

PRISM VIEW FINDER FOR REFLEX CAMERAS WITH BUILT-IN EXPOSURE METER

BACKGROUND OF THE INVENTION

This invention relates to a prism viewfinder for reflex cameras incorporating means for measurement of the exposure, this viewfinder being of the kind in which the prism has a bevel face opposite that at which the incident light enters and a plane mirror face associated with this bevel face and reflecting the light beam received from the latter away from the prism at an inclination of approximately 45° to the direction of original incidence on the prism, in which an eyepiece is disposed adjacent the face of the prism from which the reflected light eventually emerges from the latter, and in which a light-sensitive element forming part of the exposure measuring means or exposure meter is arranged adjacent the eyepiece.

In cases where the prism of a viewfinder of a reflex camera is a five-sided, so-called pentagon, prism, the arrangement is usually so devised that the light-sensitive element of the exposure meter is installed beside the eyepiece. The light-sensitive element then measures the exposure on the plane mirror surface which diverts the light beam to the eyepiece. Since the spacing of the eyepiece and the light-sensitive element from this plane mirror face is comparatively large and the longitudinal dimension of the prism viewfinder corresponds, there has to be a comparatively sharp acute angle between the orientation of the eyepiece and that of the light-sensitive element to enable useful exposure results to be achieved.

The measurements of an exposure meter for built-in exposure metering are useful when the complete image face is assessed approximately uniformly and a situation in which some areas of the image have a different degree of exposure than others is avoided. The pentagon prism previously mentioned is usually so devised that the optical axis of the eyepiece is parallel to that of the camera.

German specification DE-PS No. 12 66 630 describes a prism viewfinder for reflex cameras in which the direction of survey is at an angle of 45° to the base face of the prism or the optical axis of the camera. Inter alia this has the advantage that when a stand which is not too high is used the head can have a comfortable and favourable position. A prism viewfinder of this character has a bevel surface opposite the face at which the light beam enters and a plane mirror surface associated with this and deflecting the beam from the prism in the required fashion.

German specification DE-PS No. 20 21 179 discloses the arrangement of a light-sensitive element beside the eyepiece at the light emergent face of the prism and a built-in exposure meter. A prism viewfinder of this type incurs however the following difficulty. The distance between the eyepiece, or the beam emergent face, and the plane mirror surface is substantially less than in the case of the previously-mentioned pentagon prism. The dimensions of the eyepiece mean that the light-sensitive element is no longer in a position to measure the exposure at the plane mirror surface to any significant degree, and in addition the light-sensitive element receives light beams diffracted from different parts of the prism in a manner which is difficult to control. The integral exposure value thus is quite incorrect and much depends on how the bright and dark surfaces of any particular object are distributed.

A special problem with prism viewfinders of the type first set forth above in which the light passage is deflected out of the prism at approximately 45° inclination to its incident direction, lies in the fact that the outer dimensions of this prism are comparatively large and it is therefore inescapably necessary, during the arrangement of the exposure meter, to take care that the outer dimensions of such a prism viewfinder are not further increased.

BRIEF SUMMARY OF THE INVENTION

It is thus an object of the present invention to provide a prism viewfinder of the kind first described above with an arrangement for inbuilt metering of the exposure, in which an optimum metering result is achieved, a further object is in so doing to avoid any significant additional enlargement of the viewfinder for installation of the exposure metering means.

To meet this object the present invention, in a prism viewfinder of the kind first set forth above, proposes the provision of an additional plane face beside the eyepiece at the emergent face which additional plane face is directed substantially parallel to the aforesaid plane mirror face and is associated with the light-sensitive element. This additional plane face can directly or indirectly adjoin the beam-emergent face of the prism.

It has been found that, with the proposed arrangement of the light-sensitive element measuring the brightness of the said plane mirror surface through the said additional plane face a very good integral exposure measurement can be obtained.

The influence of the individual surface parts of the prism on the integral total value is widely uniform. The influence of vagrant beams is minimal.

In particular it has been found that the spatial demands of the exposure meter at the area concerned are very small. The light-sensitive element only requires space which is already there or is to be found in the casing of the prism viewfinder. The other elements of the exposure meter may, as is known per se, be distributed for example at other parts of the prism viewfinder so that the outer dimensions of this viewfinder are not notably altered.

The invention further proposes that the additional plane face may be furnished be forming a recess in the prism. In this case the light-sensitive element can be arranged at least partially in the recess, which makes the need for additional space insignificant.

In another constructional form of the invention the additional plane face may be provided by a further part prism cemented to the main prism. In this case also the additional spatial requirement can be kept small or use made of the space which is already reserved for the viewfinder to take care of the projecting part of the eyepiece.

Further it has been found that measuring results with the prism viewfinder according to the invention can be improved if a diaphragm made up of parallel blades is arranged between the additional plane face and the light-sensitive element. This ensures that only the light from the plane mirror surface is incident on the light-sensitive element and any vagrant beams or reflexes from the other parts of the prism, for example light which comes in through the eyepiece, are practically completely eliminated.

BRIEF DESCRIPTION OF THE DRAWINGS

Two embodiments of the invention are diagrammatically illustrated in the accompanying drawings in which.

DETAILED DESCRIPTION OF THE DRAWINGS

Figure 1:
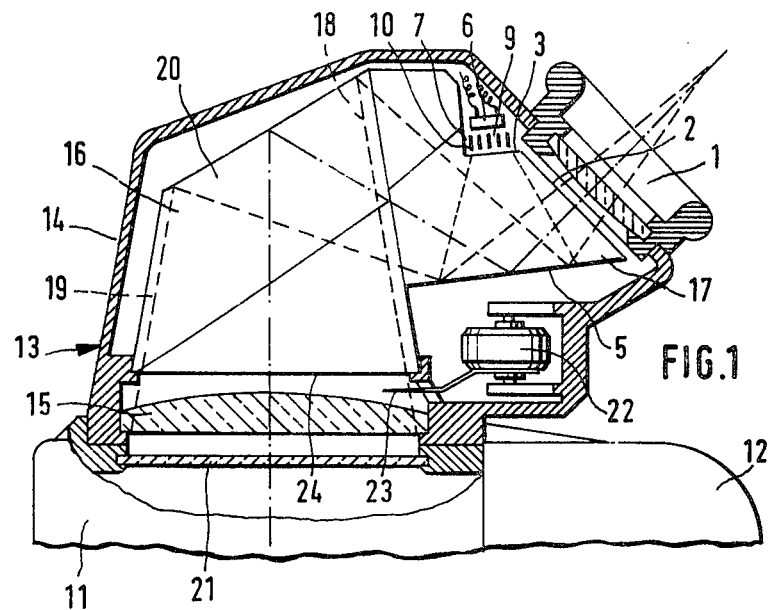
FIG. 1 is a section through a prism viewfinder in accordance with the invention.

FIG. 1 shows part of a camera 11 with a replacable loading magazine 12 mounted thereon. The camera 11 carries a prism viewfinder 13 the essential parts of which are arranged within a casing 14, viz. a lens 15 and a prism which substantially comprises two part prisms 16 and 17 cemented together. The part prism 16 is devised so as to conform closely to the incident light beam, which is shown as bounded by the dash lines 18 and 19, coming from the focussing screen 21. This beam is deflected at a bevel face 20 on the prism and thrown on to a plane mirror face 5 of the prism. From here the beam passes through the emergent face of the prism 2 to an eyepiece 1.

A recess 7 is machined into the part prism adjacent the eyepiece 1 so as to provide a plane face 3 disposed substantially parallel to the plane mirror face 5. It is to be noted that one can depart from this parallelism within certain limits without seriously interfering with the measuring result.

A light-sensitive element 6 in recess 7 measures the exposure value. Arranged between this light-sensitive element 6 and the plane face 3 is a diaphragm 9 made up of parallel blades 10.

In the embodiment illustrated an indicator instrument 22 is provided beneath the plane mirror face 5 and has a pointer 23 which projects into the space between the lens 15 and the face 24 of the viewfinder prism to enable the measured exposure value to be read off.

Figure 2:
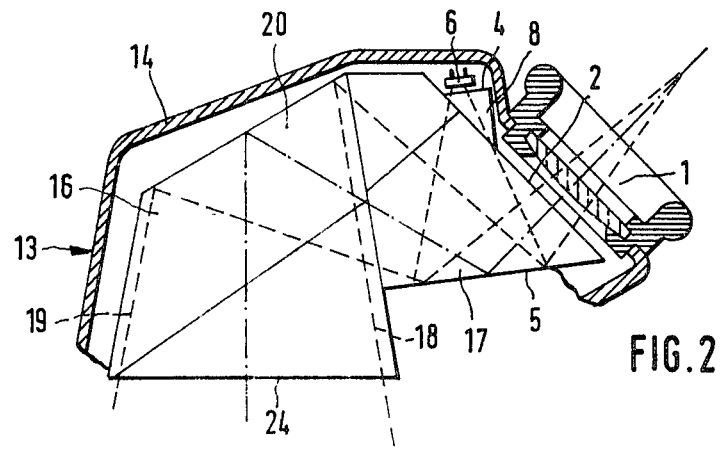
FIG. 2 is a partial sectional illustration of a modified embodiment of the invention.

Whilst in the embodiment according to FIG. 1 described above the plane face 3 is formed by provision of recess 7, in the embodiment of FIG. 2 a further and small part prism 8 is cemented to the part prism 17, this further prism carrying a plane face 4 corresponding to the face 3 of FIG. 1. The plane face 4 is thereby offset a specific distance from the emergent face 2 view by the eyepiece 1. Good results can also be achieved in this way and, as is clearly shown by FIG. 2, the additional space required for the installation of the light-sensitive element 6 is small.

What I claim is:

1. In a prism view finder for reflex cameras of the type having a casing including an opening for receiving the image of a subject, an eyepiece mounted in said casing with its optical axis disposed at approximately 45° to the optical axis of said opening, and a prism mounted in said casing adjacent said opening, said prism having a bevel face opposite said opening for receiving the image from said opening and a plane mirror face for receiving the image from said bevel face and reflecting it through a beam emergent face of said prism to said eyepiece at an inclination of approximately 45° to the direction of original incidence on the prism, the improvement comprising exposure metering means for measuring the integral exposure value of the image including an additional plane face on said prism substantially parallel to said plane mirror face, and light sensitive means adjacent said eyepiece and opposite said plane mirror surface for measuring the brightness of the plane mirror surface through said additional plane face.

2. A prism viewfinder as set forth in claim 1 wherein said exposure metering means further includes means for ensuring that only light from the plane mirror surface is incident upon the light-sensitive means comprising a diaphragm made up of parallel blades.

3. A prism viewfinder as set forth in claim 1 wherein said additional plane face directly or indirectly joins said beam-emergent face.

4. A prism viewfinder as set forth in claim 1, in which said additional plane face is formed by the base surface of a recess formed in said prism.

5. A prism viewfinder as set forth in claim 1, in which said additional plane face comprises the upper face of a subsidiary part prism attached to the main body of said prism.

* * * * *